(12) United States Patent
Cheng

(10) Patent No.: US 6,496,869 B1
(45) Date of Patent: Dec. 17, 2002

(54) RECEIVING DATA ON A NETWORKED COMPUTER IN A REDUCED POWER STATE

(75) Inventor: Shelley Cheng, Campbell, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/048,468

(22) Filed: Mar. 26, 1998

(51) Int. Cl.[7] .............................................. G06F 15/16
(52) U.S. Cl. ....................... 709/250; 370/463
(58) Field of Search ............................... 709/250, 223, 709/229, 246, 249, 213; 370/463

(56) References Cited

U.S. PATENT DOCUMENTS

| | | | | |
|---|---|---|---|---|
| 5,483,640 A | * | 1/1996 | Isfeld et al. ................ | 709/213 |
| 5,615,340 A | * | 3/1997 | Dai et al. .................... | 709/250 |
| 5,655,140 A | * | 8/1997 | Haddock ..................... | 709/246 |
| 5,751,952 A | * | 5/1998 | Dai et al. .................... | 709/250 |
| 5,796,944 A | * | 8/1998 | Hill et al. .................... | 709/250 |
| 5,805,816 A | * | 9/1998 | Picazo, Jr. et al. .......... | 709/223 |
| 5,812,792 A | * | 9/1998 | Haddock et al. ............ | 709/249 |
| 5,826,015 A | * | 10/1998 | Schmidt ..................... | 709/229 |
| 5,915,119 A | * | 6/1999 | Cone .......................... | 709/223 |
| 5,938,771 A | * | 8/1999 | Williams et al. | |
| 5,940,771 A | * | 8/1999 | Gollnick et al. | |
| 6,101,608 A | * | 8/2000 | Schmidt et al. | |

OTHER PUBLICATIONS

National Semiconductor CompactRISC™ 32–Bit Architecture; National Semiconductor Corporation; 1997.
Network PC System Design Guidelines; Compaq Computer Corporation et al.; pp. 1–152; Aug. 5, 1997.
82558 Fast Ethernet PCI Bus LAN Controller with Integrated PHY Product Brief; Intel Corporation; Apr. 1997.
Implementation of Magic Packet™–Ready Motherboard; Advanced Micro Devices, Inc.; pp. 1–14; Apr. 1997.
Glen Gibson; Magic Packet™ Technology; Advanced Micro Devices, Inc.; pp. 1–5; Nov. 1995.

* cited by examiner

*Primary Examiner*—Mark H. Rinehart
*Assistant Examiner*—Marc D. Thompson
(74) *Attorney, Agent, or Firm*—Girard & Equitz LLP

(57) ABSTRACT

A networked computer includes a system controller having a network interface. When the networked computer enters a reduced-power state, the network interface receives frame data. The network interface filters the frame data and saves selected frame data to a memory. The memory provides the frame data to the system controller.

11 Claims, 5 Drawing Sheets

RECEIVING DATA ON A NETWORKED COMPUTER IN A REDUCED POWER STATE

FIELD OF THE INVENTION

The invention relates generally to monitoring the system environment of an inactive networked computer, and more specifically to monitoring network activity for specific events.

BACKGROUND OF THE INVENTION

Local Area Networks (LAN's) consist of a group of interconnected computers communicating according to a common protocol such as Ethernet (IEEE Standard 802.3). In a client-server type LAN, a server computer maintains files, which may be accessed by client computers. The server may also monitor and perform various maintenance functions on the client computer.

To save energy and reduce costs, client computers may enter a reduced-power (or sleep) state when they are not in active use. A sleep-state shuts-down most components of a client computer and maintains only minimal functionality. Various techniques have been implemented to allow a server computer to wake-up a sleeping client computer. Generally these techniques require the sleeping computer to monitor network activity.

For this purpose, some network interfaces provide a hardware state machine which is configured to monitor for specific bit patterns when the computer enters a sleep state. This allows the network interface to detect specific network events, however configuration is generally fixed. Accordingly, network interfaces having a hardware state machine may not be easily reconfigured to meet the needs of a specific application.

Other solutions may use a standard MAC accessing a direct memory access (DMA) first-in first-out (FIFO) memory for receiving network frame data. Frame data saved to the system memory may be parsed to detect specific bit patterns. These interfaces provide greater flexibility. Specifically, these interfaces may be programmed to monitor for different bit patterns depending upon the application. Unfortunately, these interfaces likewise impose greater cost and complexity.

SUMMARY OF THE INVENTION

According to one aspect of the invention a network interface suitable for receiving frame data over a network includes a media access control, a buffer manager, and a memory. The media access control provides a connection to a media interface. The buffer manager is operationally coupled with the media access control and is configured to receive frame data from the media access control. The memory has a plurality of segments, which are operationally coupled with the buffer manager. The buffer manager is configured to write the frame data to the memory segments.

According to another aspect of the invention, a receive buffer memory has a plurality of segments. The receive buffer memory receives first and second frame data from a network. The receive buffer memory writes the first frame data to a first segment of the receive buffer memory and writes the second frame data to a second segment of the receive buffer memory. The receive buffer memory also reads the first frame data from the first segment of the receive buffer memory simultaneous the writing of the second frame data.

According to another aspect of the invention, a controller suitable for monitoring events related to a computer system includes a control processor, a plurality of connections, and a network interface. The control processor is configured to communicate with a host processor. The plurality of connections are operationally coupled with the control processor. The control processor is configured to monitor system events over the plurality of connections. The network interface is operationally coupled with the control processor and has a memory partitioned into a plurality of segments. The segments provide frame data to the control processor. The control processor is configured to monitor network events from the frame data.

According to another aspect of the invention, a computer system has a network connection. The computer system enters a reduced power state. The computer system receives a plurality of frames from a network. The computer system filters the plurality of frames. The computer system writes first frame data from the plurality of frames to a first segment of a receive buffer memory. The computer system reads the first frame data from the first segment of the receive buffer memory.

These and other objects, features and advantages will become apparent when considered with reference to the following description and the accompanying drawings.

DETAILED DESCRIPTION

Figure 1:
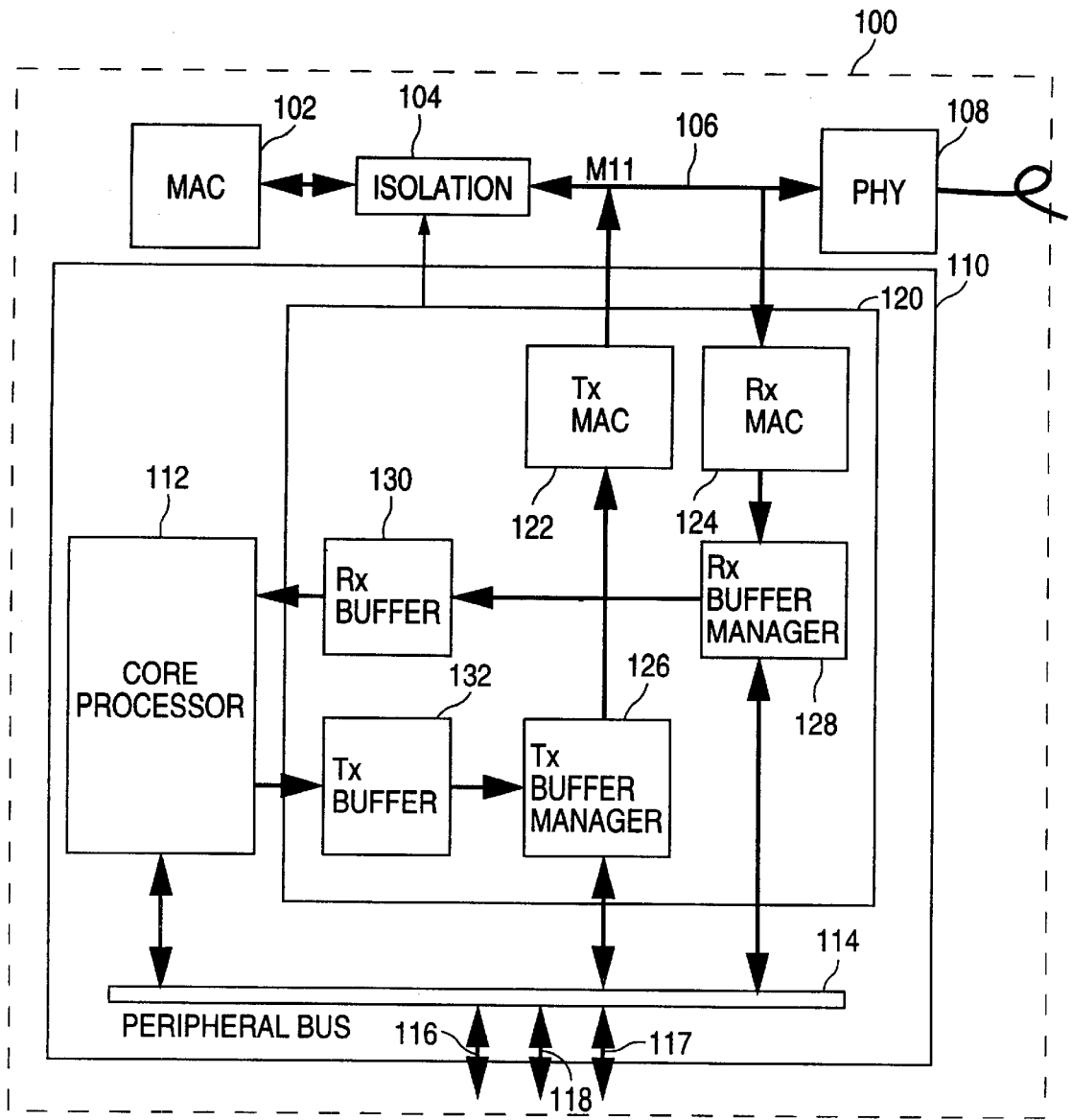
FIG. 1 is a block diagram of a system management controller according to the invention.

With reference to FIG. 1, a preferred embodiment of a system management controller 110 is described. The controller 110 is a chip mounted on the mother-board of a host computer 100. The controller 110 connects to a host computer via a host interface bus 116 (such as an Industry Standard Architecture bus) so that the host computer's processor is able to communicate with the controller 110. This interface allows the host computer 100 to issue commands to and share data with the controller 110.

The controller 110 also includes a number of external connections 118 to the host computer 100. These connections allow the controller 110 to monitor system environment parameters. For example the controller 110 is configured to monitor system voltages, fan speeds, temperatures, and other related parameters. In addition connections 118 are configured to monitor external events. For example the controller 110 provides connections to a telephone ring detection circuit, a chassis intrusion detection circuit, a power switch circuit, interrupt circuits, and other event circuits.

The host computer 100 is of the type having an interface to an external network. This interface includes a physical layer 108, which provides the connection to a network. The interface also includes a media access control (MAC) layer 102 connected to the physical layer 108 through the media independent interface (MII) 106. The MAC layer 102 interfaces with the host computer's operating system to allow the host computer to send and receive network data.

The controller 110 also includes a network interface 120. The network interface 120 includes a transmit MAC layer 122 and a receive MAC layer 124. The transmit MAC 122 and the receive MAC 124 comply with IEEE 802.3. These MAC layers interface the host computer's PHY layer 108 over the MII 106. When the host computer enters a sleep state, the controller 110 activates an isolation block 104. This disconnects the host computer's MAC layer 102 from the host computer's PHY layer 108, and enables the network interface 120 to transmit and receive data over an external network.

To transmit data, the network interface 120 reads data from the transmit buffer 132. More specifically, the buffer manager 126 reads the frame data from the transmit buffer 132. The transmit buffer manager 126 then provides the data to the transmit MAC 122. The transmit MAC 122 adds an appropriate preamble and start of frame delimiter to the data and provides it to the MII 106 for network transmission by the PHY layer 108. The transmit buffer manager 126 continues to read data from the transmit buffer 132 until its contents are empty. The buffer manager 126 continues to provide the data to the transmit MAC 122 for transmission over the network. The transmit MAC 122 also appends a frame check sequence at the end of a data packet.

Data received over the network is provided to the receive MAC 124 by the PHY layer 108 over the MII 106. The receive MAC 124 controls the receive operations during reception and loop-back.

Reception begins upon detection of the start of frame delimiter byte pattern. This activates a de-nibblizer circuit within the receive MAC 124, which packs the incoming four-bit-wide nibbles into sixteen-bit words.

The receive MAC ignores the rest of the preamble. The receive MAC 124 then begins transferring the destination portion of the incoming frame data to the receive buffer manager 128. At the same time, a receive filter circuit within the receive MAC 124 processes the destination address of the incoming packet. If the receive filter circuit determines that the packet should be accepted, the de-nibblizer passes the remainder of the packet to the receive buffer manager 128. The receive MAC 124 terminates reception when the carrier sense signal goes inactive.

After the reception of a complete packet, the receive MAC 124 performs error checking. Specifically, the receive MAC 124 checks for frame alignment errors, symbol errors, cyclic redundancy check errors, and length errors. If the packet fails any of these checks, the receive MAC 124 sets a flag to the receive buffer manager 128.

The controller 110 also includes a core processor 112. The core processor 112 may write data to the transmit buffer 132 or read data from the receive buffer 130. The core processor coordinates data transfers with the transmit and receive buffer managers, 126 and 128, over the peripheral bus 114.

In operation, the host computer's processor issues configuration commands to the controller 110. These commands instruct the controller 110 to monitor certain events such as environment parameters and external events. The controller 110 then monitors for the commanded events. When the host computer is in a sleep state, the events may be used to generate an interrupt signal. When the host computer is in an active state the events may be used to notify the host computer's processor of the event.

The commands from the host computer's processor may also instruct the controller 110 to monitor network activity, and to transmit data. When the host computer is in an active state, it controls the network interface (i.e. PHY layer 108). However, when the host computer enters a sleep state the controller 110 energizes the isolation block 104, and asserts control over the network interface.

Before entering a sleep state, the host computer's processor may command the controller 110 to monitor for specific events. For example, the controller 110 is programmable to monitor network activity for specific packets. The specific packets may contain the host computer's address in the destination address field, may have a unique bit pattern such as a MAGIC PACKET (i.e. a packet having sixteen repetitions of the destination address), or may otherwise contain an identifiable bit pattern.

The controller 110 is further programmable to take specific actions. The controller 110 may transmit packet data, issue a wake-up interrupt to the host computer's processor, or activate controller outputs 117.

Before entering a sleep state, the host computer's processor may command the controller 110 to perform specific actions upon the occurrence of specific events. For example, the controller 110 is programmable to automatically respond to address resolution protocol (ARP) or other packets. The controller 110 also is programmable to report other diagnostic information over the network. The diagnostic information includes system environment parameters and external events. Thus, the controller 110 is programmable to respond to diagnostic requests received over the network. The controller is also programmable to transmit diagnostic information upon the occurrence of other events.

Figure 2:
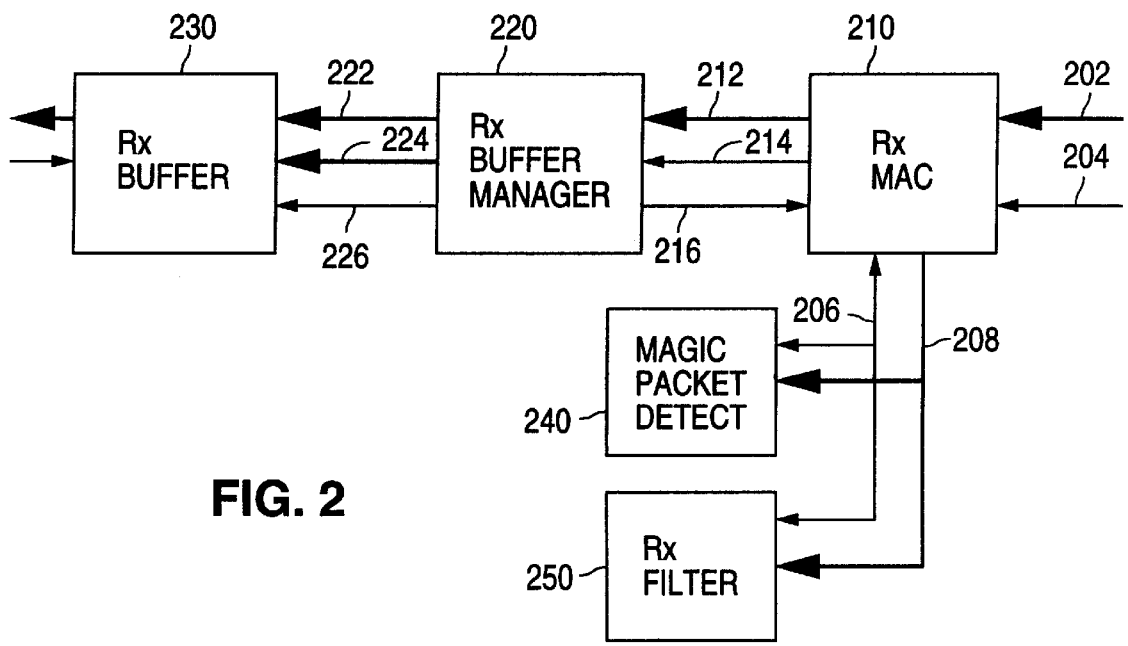
FIG. 2 is a block diagram showing the receive portion of a network interface according to the invention.

Turning to FIG. 2, a preferred embodiment of the receive portions of a network interface are described. Control lines 204 provide network status information to the receive MAC 210 from the MII 106. The control lines 204 include clock, collision, carrier sense, receive error, and data valid signals from the MII 106. Bus 202 provides frame data to the receive MAC 210 from the MII 106.

Upon detection of the start of frame delimiter signal, the receive MAC 210 notifies the buffer manager 220 over control lines 214. The receive MAC 210 also notifies the MAGIC PACKET detect circuit 240 and the receive filter 250 over control lines 206. The receive MAC 210 then provides the destination address field of the incoming packet to the receive buffer manager 220 over data bus 212. The receive MAC 210 also provides the destination address field to MAGIC PACKET detect circuit 240 and receive filter 250 over data bus 208.

The receive MAC 210 continues to provide the incoming frame data to the MAGIC PACKET detect circuit 240 independent of a destination address match. The detect circuit 240 monitors the frame for the occurrence of a MAGIC PACKET. If a MAGIC PACKET is found, the detect circuit 240 generates an interrupt signal which is used to wake-up the host computer.

The receive filter 250 is programmable to accept predefined destination addresses. If the incoming destination address matches one of the pre-defined destination addresses, the receive filter 250 notifies the receive MAC 210. The receive MAC 210 in turn notifies the receive buffer manager 220 and provides the remainder of the incoming frame data to the receive buffer manager 220. If the receive filter 250 does not generate a match, the packet is disregarded.

When the receive MAC 210 begins to receive data from the MII interface, it asserts a start of frame signal. At this point, the receive buffer manager prepares to receive a first word of incoming packet. If space is available in memory pointed to by an in pointer, then the receive continues normally. The buffer manager 220 selects an address location in the receive buffer 230 over address bus 224. The buffer manager 220 then generates a write signal 226, and provides the frame data over data bus 222.

At the end of a frame, the receive MAC 210 performs error checking. If no errors have occurred, and the buffer manager increments the in pointer. If the MAC 210 detects an error, however, the MAC activates an error signal over lines 214. If the buffer manager 220 receives an error signal, the in pointer is not incremented and the buffer manager 220 disregards the data received for that frame. The buffer manager 220 may later overwrite the data received for that frame.

If no space is available in the buffer 230 when the receive MAC 210 asserts a start of frame signal, the buffer manager disregards the incoming data. If the MAC 210 does not detect an error with the incoming data, a lost packet count is incremented. If an error is detected, transmission is stopped and the lost packet count is not incremented.

Figure 7:
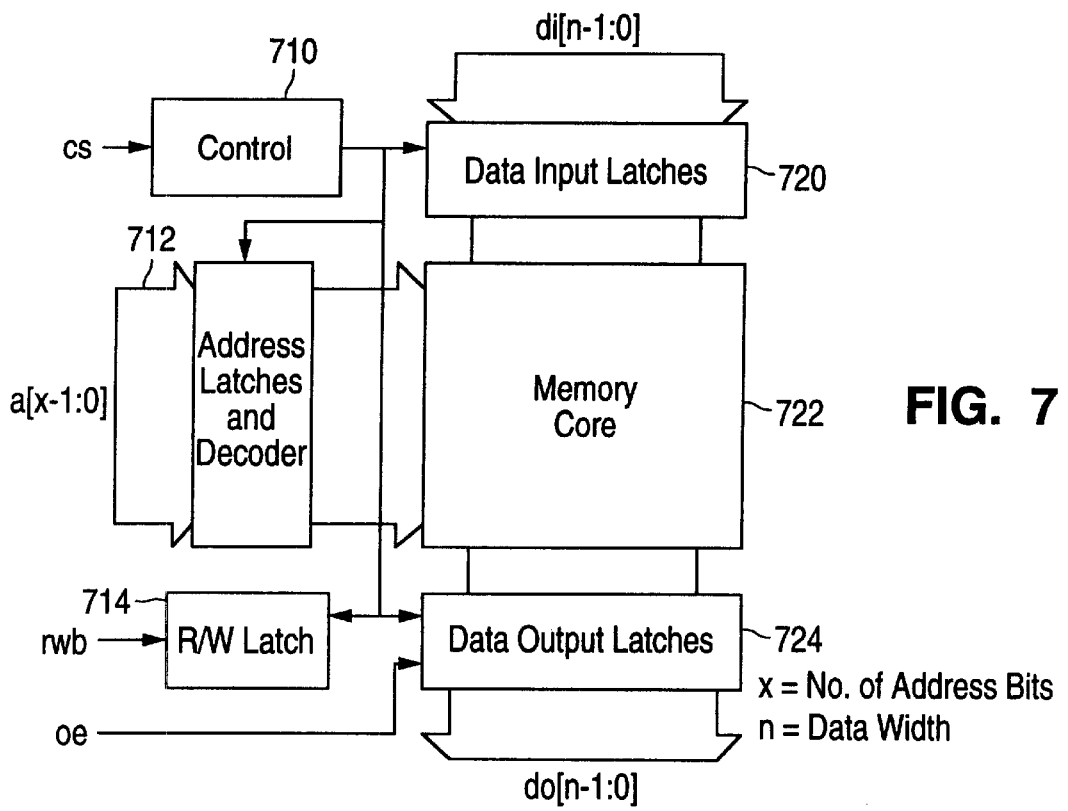
FIG. 7 is a block diagram showing a receive buffer memory according to the invention.

Turning to FIG. 7, one embodiment of the receive buffer will be described. Memory core 722 holds n bits of data at x address locations. To write data to the memory core 722, the R/W latch 714 must be placed in a low state by the read-write (rwb) signal. At the same time, write data is provided to data input latches 720 over a data input (di) bus, and a memory location is selected on the address latch 712 over an address (a) bus. A positive edge on the control (cs) signal causes the control block 710 to perform the latching of the read-write, data, and address signals. The cs signal then returns to a low state, and the data is written to the desired address location in the memory core 722. After a predetermined period of time, the memory is ready for another read or write operation.

To read data from the memory core 722, the R/W latch 714 must be placed in a high state by the rwb signal. At the same time, a memory location is selected on the address latch 712 over the address bus. A positive edge on the cs signal causes the control block to perform the latching of the read-write and address signals. The cs signal then returns to a low state, and after a predetermined period of time the contents of the memory core 722 at the selected address are provided by the data output latch 724 over an output (do) bus. The output (oe) enable signal allows control of the data output bus. After a predetermined period of time, the memory is ready for another read or write operation.

Figure 8:
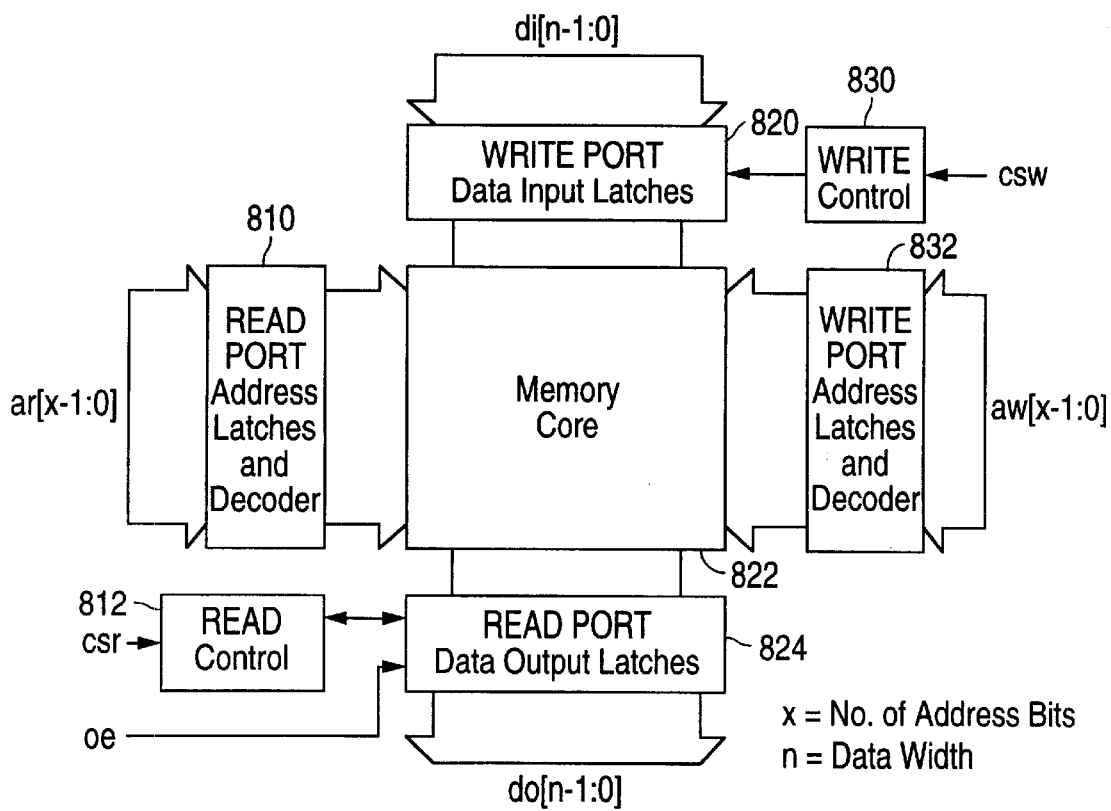
FIG. 8 is a block diagram showing another receive buffer memory according to the invention.

Turning to FIG. 8, a preferred embodiment of the receive buffer will be described. Memory core 822 holds n bits of data at x address locations. To write data to the memory core 822, the write control block 830 must be placed in a high state by the write (csw) signal. At the same time, write data is provided to data input latches 820 over a data input (di) bus, and a memory location is selected on the address latch 832 over an address (aw) bus. A positive edge on the csw signal causes the write control block 830 to perform the latching of the data, and address signals. The csw signal then returns to a low state, and the data is written to the desired address location in the memory core 822. After a predetermined period of time, the memory is ready for another write operation.

To read data from the memory core 822, the read control block 812 must be placed in a high state by the csr signal. At the same time, a memory location is selected on the address latch 810 over the address ar bus. A positive edge on the csr signal causes the read control block 812 to perform the latching of the address signal. The csr signal then returns to a low state, and after a predetermined period of time the contents of the memory core 822 at the selected address are provided by the data output latch 824 over an output (do) bus. The output enable (oe) signal allows control of the data output bus. After a predetermined period of time, the memory is ready for another read operation. The read and write operations may occur simultaneously.

Figure 3:
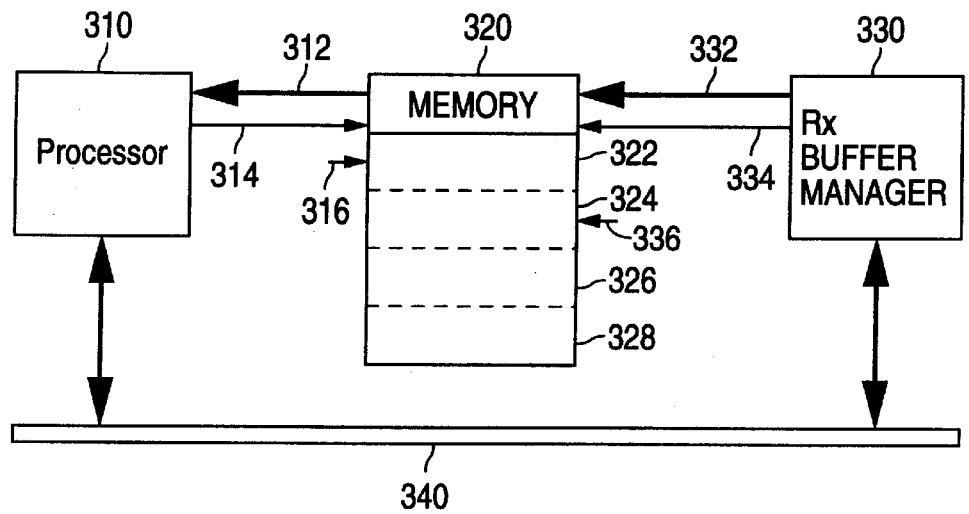
FIG. 3 is a block diagram showing a receive buffer and a receive buffer manager according to the invention.

Turning back to FIG. 3, preferred embodiments of a receive buffer 130, a processor 112, and a manager 126 are described. The receive buffer is shown as a memory 320, such as a Dual-Port RAM, partitioned into multiple (e.g. four) portions or segments. Specifically, the buffer manager 320 is partitioned into a first segment 322, a second segment 324, a third segment 326, and a fourth segment 328. When used as a receive buffer for a system environment controller, the necessary portion of incoming packet data is relatively short. For example, the system controller expects to receive diagnostic requests, ARP's and other similar frames. The system controller may also expect to receive longer frames, however, in the sleep state the system controller may only require the first portion. Accordingly, the memory is sized to accommodate the expected necessary frame length (e.g. four segments at 128 bytes each).

The receive buffer manager 330 connects to the receive buffer 320 over control lines 334 and data bus 332. The control lines 334 include an address bus and a write signal. The buffer manager 330 also maintains an index pointer 336. The index pointer 336 selects a memory segment. As shown the index pointer 336 currently selects the second memory segment 324.

The processor 310 connects to the receive buffer 320 over control lines 314 and data bus 312. The control lines 314 include an address bus and a read signal. The processor 310 also maintains an index pointer 316. The index pointer 316 also selects a memory segment. As shown, the index pointer 316 currently selects the first memory segment 322.

At the start of a first frame received by the buffer manager 330, the index pointer 336 will point to the first memory segment 322. Accordingly, the buffer manager 330 will write the frame data to the first memory segment 322. The buffer manager 330, selects an address location within the first memory segment 322 and generates a write signal over lines 334. The buffer manager 330 then provides frame data over data bus 332. The buffer manager 330 continues writing data to sequential memory locations within the first segment until the frame is complete, or until the first memory segment is full. If the frame is larger than the memory segment, the portion of the frame extending beyond the memory segment is disregarded.

The buffer manager 330 then updates index pointer 336 to point to the second memory segment 324. A second frame will be written to the second memory segment 324 in the same way the first frame was written to the first memory segment 322.

After completion of writing a frame to the data buffer 320, the buffer manager 330 notifies the processor 310 via a more status bit over peripheral bus 340. The more status bit is set if the in pointer is not equal to the out pointer. When the more status bit is set, the index pointer 316 identifies the next unread packet. After the buffer manager writes data to the first memory segment 322 and sets the more status bit, the processor 310 then reads the contents of the first memory segment 322. Upon completion, the processor 310 updates the index pointer 316 to point to the next memory segment and notifies the buffer manager 330 over peripheral bus 340.

The buffer manager 330 continues writing frame data to memory 320 as it is received. The processor 310 continues reading frame data as long as the more status bit is set. When the pointers 316 and 336 reach the fourth portion of memory, they are next incremented to again point to the first portion. Accordingly, the data buffer 320 acts as a circular memory.

The buffer manager 330 monitors the index pointer 316 so that it will not write data to a segment containing unread frame data. If valid frame data is received but all the segments contain unread data, the buffer manager 330 increments a lost packet counter.

The data buffer 320 is a dual port memory and may be simultaneously accessed by both the processor 310 and the buffer manager 330 provided both do not attempt to access the same memory location.

Figure 4:
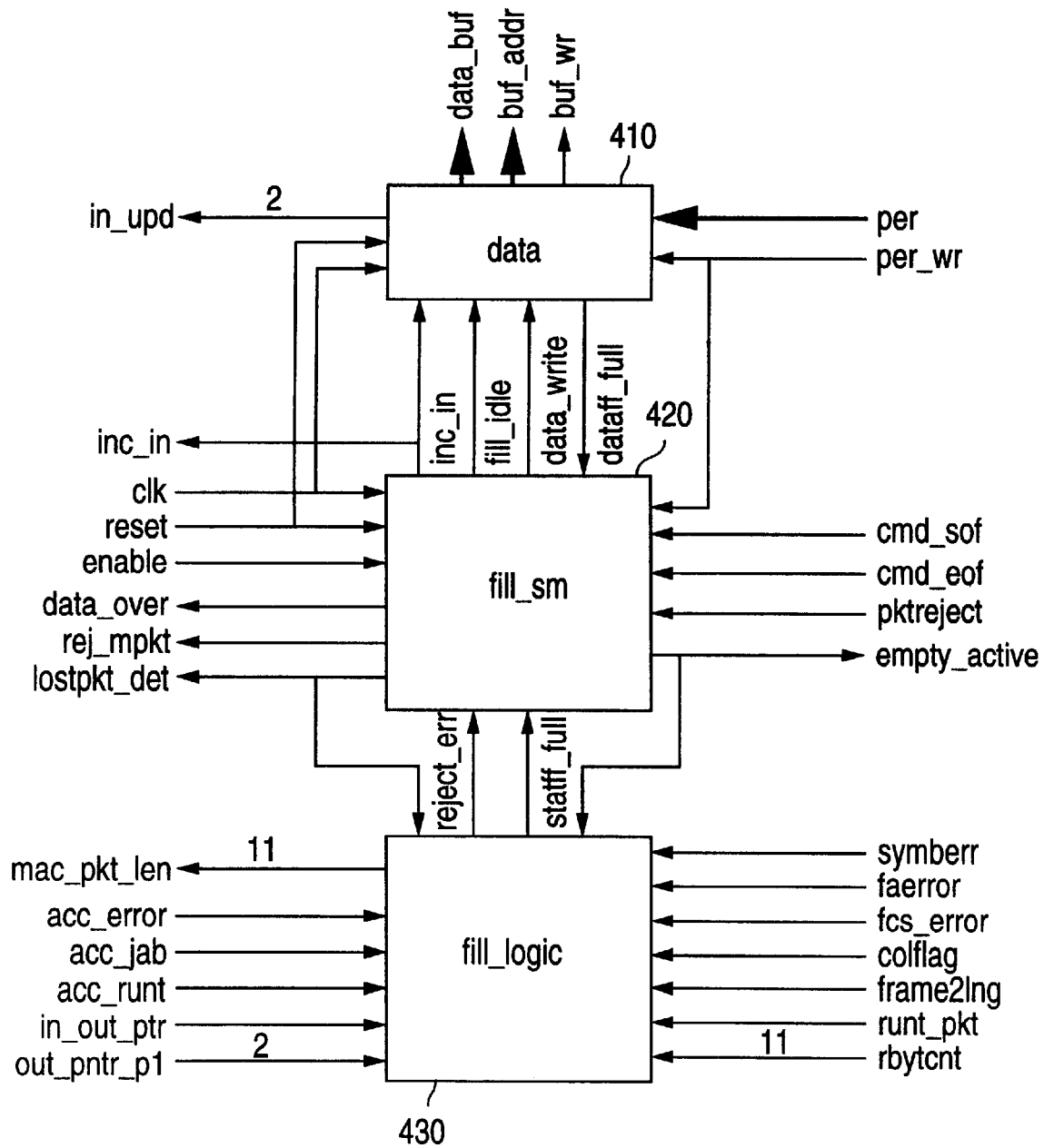
FIG. 4 is a block diagram showing another receive buffer manager according to the invention.

Turning to FIG. 4, a preferred embodiment of a receive buffer manger is discussed. The receive buffer manger includes a data block 410, a fill state machine 420, and a fill logic circuit 430.

Generally, the data block 410 acts as a data pipeline between a receive MAC 124 and a data buffer 130. The fill state machine 420 coordinates transfers from the receive MAC and the data buffer. The fill logic circuit 430 generates signals indicating the status relating to the reception of data from an external network.

More specifically, the fill state machine 420 receives clock (clk), reset, and enable signals. The state machine 420 also receives write packet data command (par-wr), start of frame command (cmd-sof), end of frame command (cmd-eof), and packet reject (pktreject) signals from a receive MAC. The state machine further receives a segment full (dataff-full) signal from the data block 410, and reject error (reject-err) and memory full (statff-full) signals from the fill logic circuit 430.

The par-wr signal indicates that the MAC is currently providing frame data to data block 410. The cmd-sof signal indicates that the MAC has received a valid start of frame delimiter bit pattern. The cmd-eof signal indicates that the MAC has detected the end of an incoming frame. The pktreject signal indicates when the MAC has qualified the incoming packet based on the destination address field. The dataff-full signal indicates that the segment, currently selected by the buffer index pointer, is full of frame data. The reject-err signal indicates an error in the incoming packet. The statff-full signal indicates that all of the memory segments currently contain unread frame data.

In response to these signals, the fill state machine 420 generates data-over, reject MAGIC PACKET (rej-mpkt), lost packet (lostpkt-det), increment index pointer (inc-in), fill-idle, data-write, and empty-active signals.

The data-over signal indicates that the incoming frame exceeded the length of the current memory segment. The rej-mpkt indicates that the incoming data is invalid. This signal is provided to the MAGIC PACKET detect block so that if this block detects a MAGIC PACKET it will not assert a MAGIC PACKET detect signal.

The lostpkt-det signal indicates that the MAC received an incoming packet but that no memory segments were available in which to write the packet data. Accordingly, an incoming packet was disregarded. The inc-in signal indicates that the process of writing new frame data to the current memory segment has successfully completed. Accordingly, the buffer index pointer is incremented. The fill-idle signal indicates that the buffer manager is not currently writing frame data to memory. The data-write signal indicates that the buffer manager is currently writing frame data to memory. The empty-active signal indicates that the processor is currently reading frame data from a memory segment.

The data-over, reject MAGIC PACKET, lost packet and inc-in signals are provided to a processor. The inc-in, fill idle, and data write signals are provided to the data block 410. The lost packet, and empty active signals are provided to the fill logic circuit 430. The empty active signal is provided to the MAC.

The fill logic circuit 430 receives a byte count (rbytcnt) signal and a number of error signals (e.g. symberr, faerr, fcs-error, colflag, frame2lng, and runt-pkt signals) from the MAC. The byte count signal indicates the byte length of the incoming frame. The fill logic circuit also receives processor index pointer (out-pntr-pl), increment processor index pointer (m-out-ptr), and error (e.g. acc-error, acc-jab, and acc-runt) signals from the processor.

In response to these signals, the fill logic circuit 430 generates a packet length signal (mac-pkt-len) which indicates the byte length of the incoming packet. This signal is provided to the processor. The fill logic circuit 430 also generates the reject-err and statff-full signals.

The data block 410 receives the par-wr, data-write, fill-idle, inc-in, clk, and reset signals. In addition, the data block 410 receives a data signal (par) over a data bus. In response to these signals, the data block generates the dataff-full signal. The data block 410 also generates buffer write (buf-wr), buffer address (buf-addr), and data (data-buf) signals. These signals are used to write frame data to a buffer memory. Specifically, the buf-addr signal selects an address location, and the data-buf signal provides frame data. The buf-wr signal enables the writing of the frame data to the selected address. The data block 410 also generates a buffer index pointer (in-upd) signal. The in-upd signal indicates the currently selected memory segment.

Figure 5:
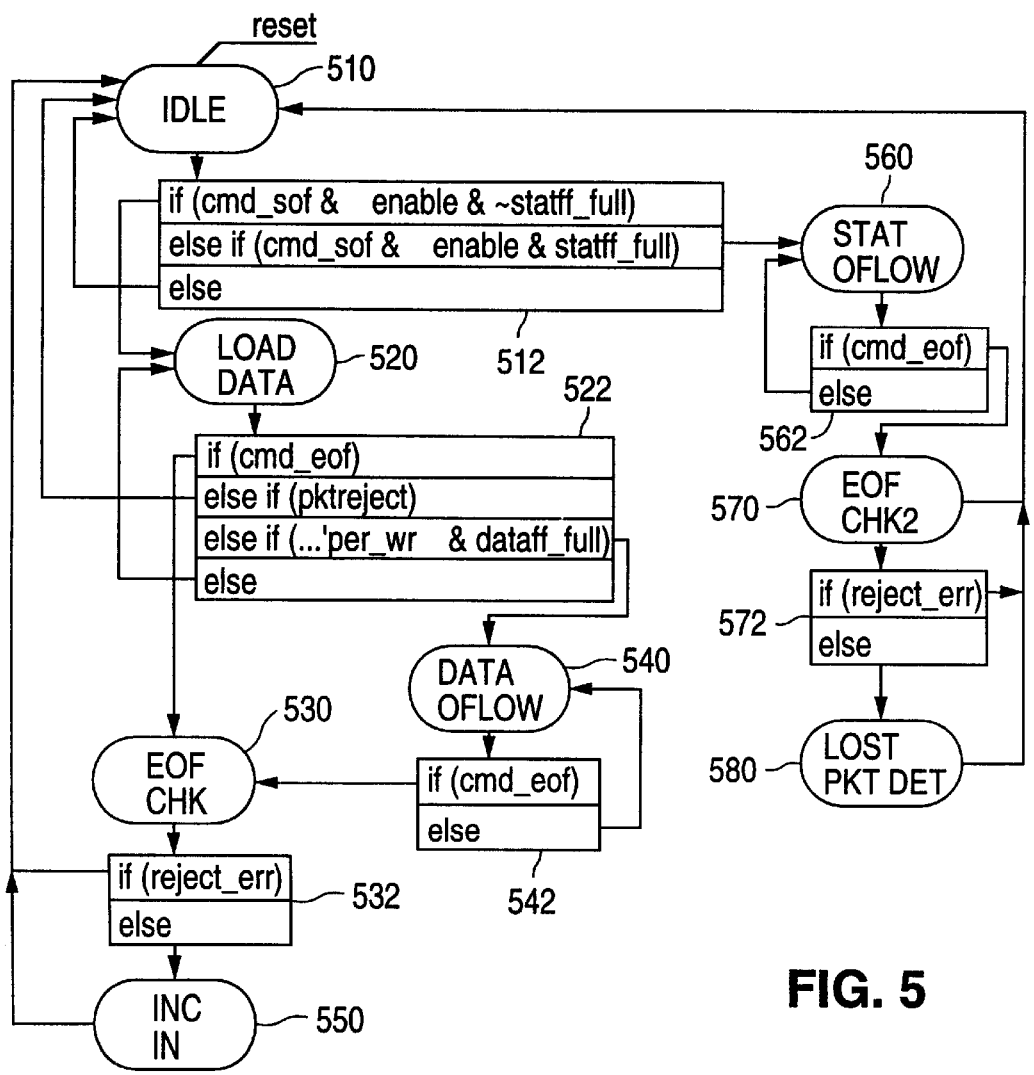
FIG. 5 is a flow chart showing the operation of a receive buffer manager according to the invention.

Turning to FIG. 5, the operation of a buffer manager according to invention is described. The buffer manager enters an idle state 510 upon receipt of a reset signal from a processor. At block 512, the buffer manager then tests the status of a command start of frame (cmd-sof) signal and a receive enable signal from a MAC, and a memory full (statff-full) signal. If the buffer manager is receiving the command start of frame signal and the enable signal and the memory is not full, the buffer manager proceeds to a load data state 520. If the buffer manager is receiving the command start of frame signal and the enable signal and the memory is full, the buffer manager proceeds to a memory overflow state (stat oflow) 560. Otherwise, the buffer manager remains in idle state 510.

In the load data state 520, the buffer manager writes frame data received by the MAC to a buffer memory. The data is written to the memory segment selected by an index. Within the memory segment selected by the index, data words are written to successive addresses starting from the beginning of the indexed portion. At block 522, if the buffer manager is receiving a command end of file signal from the MAC, the buffer manager proceeds to an end of file check (eof chk) state 530. Otherwise, if the buffer manager is receiving a packet reject signal (pktreject) signal from the MAC the buffer manager returns to idle state 510. Otherwise, if the buffer manager is receiving a write signal (par-wr) from the MAC but is also receiving a memory portion full (dataff-full) signal from a data block, the buffer manger proceeds to a data overflow (data oflow) state 540. Otherwise, the buffer manager returns to load data state 520. The buffer manager receives another word of data from the MAC and writes the word to the next address space within the current memory segment, as selected by the index.

In the end of frame check state 530, the buffer manager tests for a reject error signal. This signal indicates that either the MAC or the processor detected an error during the data transfer. At block 522, if the buffer detects the reject error signal, the frame is disregarded and the buffer manager returns to the idle state 510. Otherwise, the buffer manger proceeds to an increment index (inc in) state 550. Here the buffer manger increments the index to point to the next memory segment. As the memory acts as a circular memory, if the index currently points to the highest memory segment, the index is incremented to point to the first memory segment. For example, if the memory is divided into four portions and the index currently points to the fourth portion, the index is incremented to point to the first portion. In addition, the buffer manager performs other updating functions. For example, the buffer manager updates an address pointer to address the first memory location within the current portion of memory. The data buffer then returns to idle state 510.

Returning to data overflow state 540, the buffer manager enters this state if the size of the incoming frame received by the MAC exceeds the capacity of the current memory segment. When this occurs, the buffer manager continues to receive data from the MAC but does not write the data to memory. Accordingly, only the first portion of the frame will be written to memory. The portion extending beyond the size of the current portion of memory will be disregarded. Eventually, the MAC will transmit the last portion of the incoming frame and assert a command end of file (cmd-eof) signal. At block 542, the buffer manager tests for this signal. Upon receipt, the buffer manager proceeds to end of frame check state 530. Otherwise the buffer manager remains in the data overflow state 540.

In the memory overflow state 560, the buffer manager has determined that all of the memory segments currently contain frame data which has not yet been read by a processor. Nonetheless, the MAC has asserted a command start of frame signal indicating it has received another start of frame. In this state, the buffer manager disregards any incoming frame data and waits for an end of file command (cmd_eof). At block 562, if the buffer manager detects this signal it proceeds to a second end of frame check (eof chk2) state 570. Otherwise the buffer manager remains in the overflow state 560.

In the second end of frame check state 570, the buffer manager determines whether the MAC detected an error with the incoming frame. At block 572, if the buffer manager detects a reject error signal, the buffer manager returns to idle state 510. Otherwise, the buffer manager proceeds to lost packet detected (lost pkt det) state 580. In this state, the buffer manager generates a lost packet detected signal which is provided to the processor and to a pin for external monitoring. The buffer manager then returns to idles state 510.

Figure 6:
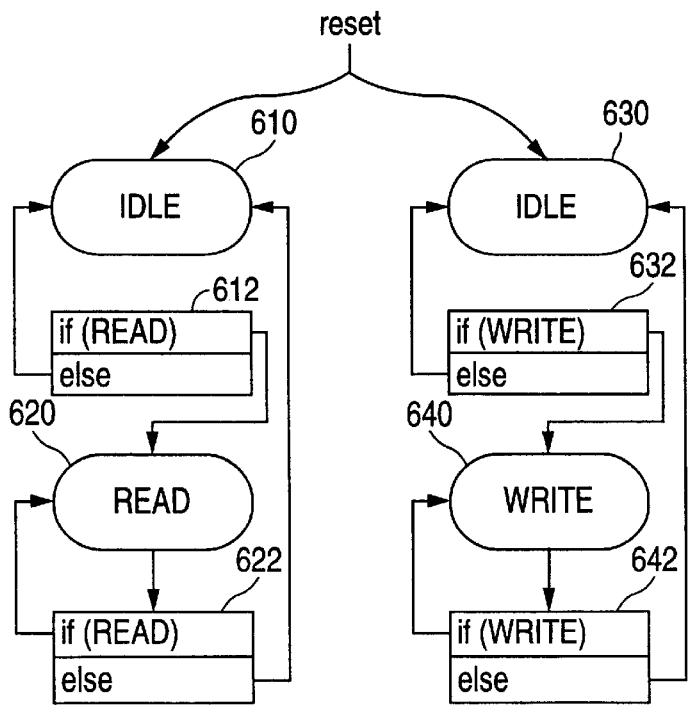
FIG. 6 is a flow chart showing the operation of a dual port memory according to the invention.

Turning to FIG. 6, the operation of a buffer memory according to the invention is described. The buffer memory is able to write data to and read data from memory. Moreover, the buffer memory is able simultaneously to received data over a first bus and write that data to memory, and to read data from memory and provided that data over a second bus. As the read and write operations occur independent of one another, the buffer memory simultaneous operates in two states. One of the states indicates a read state. The other state indicates a write state. As shown in FIG. 6, upon receiving a reset signal, the buffer memory enters both a read idle state 610 and a write idle state 630.

In read idle state 610, the buffer memory waits to receive a read signal from a processor. At block 612, if the buffer memory detects the read signal it proceeds to a read state 620. Otherwise, it remains in the read idle state 610.

In the read state 620, the buffer memory detects an address signal over an address bus. The buffer memory reads data from its memory at the selected address and provides the data as a data signal over a data bus. At block 622, the buffer memory detects whether the read signal is still active. If so, the buffer memory returns to the read state 620 to read the data at the next selected address location. Otherwise, the buffer memory returns to idle state 610.

From the write idle state 630, the buffer memory waits to receive a write signal from a buffer manager. At block 632, if the buffer memory detects the write signal it proceeds to write state 640. Otherwise it remains in the write idle state 630.

In write state 640, the buffer memory detects an address signal over an address bus and a data signal over a data bus. The buffer memory writes the data to the selected address. At block 642, the buffer memory detects whether the write signal is still active. If so, the buffer memory returns to the write state 640 to write the next data to the next selected address location. Otherwise, the buffer memory returns to idle state 630.

Although the embodiments described herein are with reference to a receive buffer and receive buffer manager having a particular configuration, the present invention could be implemented with memories and managers having different configurations. Those skilled in the art will certainly understand from the embodiments discloses herein that many modifications are possible without departing from the teachings hereof. All such modifications are intended to be encompassed within the following claims.

I claim:

1. A network interface suitable for receiving frame data over a network, comprising:

a media access control providing a connection to a media interface, wherein the media access control has at least one input configured to receive incoming frame data and at least one output, the media access control is configured to filter the incoming frame data and to assert the frame data at the at least one output, and the media access control is configured to detect repetitions of a pre-defined address that are included in the incoming frame data and, in response to detecting repetitions of the pre-defined address, to generate an interrupt signal that is used to wake up a host computer;

a buffer manager operationally coupled with the media access control and configured to receive the frame data from the at least one output of the media access control; and a memory operationally coupled with the buffer manager, wherein the buffer manager is configured to write at least some of the frame data received from the media access control to the memory.

2. The network interface of claim 1, wherein the memory comprises a dual port memory.

3. The network interface of claim 1, wherein the memory is partitioned into a plurality of segments.

4. The network interface of claim 1, wherein the media access control is configured to receive ethernet frame data from the media interface.

5. The network interface of claim 1, wherein the media access control performs error detection and provides error signals to the buffer manager.

6. The network interface of claim 3, wherein the buffer manager comprises an index pointer selecting one of the memory segments.

7. The network interface of claim 3, wherein the buffer manager generates an overflow signal if an incoming frame exceeds the length of a memory segment.

8. The network interface of claim 3, wherein the buffer manager generates a lost packet signal if incoming frame data is received while all of the memory segments contain unread frame data.

9. The network interface of claim 1, wherein the is buffer memory comprises a random access memory.

10. The network interface of claim 3, wherein the buffer memory provides simultaneous access for writing frame data to a first memory segment of the plurality of memory segments and for reading frame data from a second memory segment of the plurality of memory segments.

11. The network interface of claim 10, wherein the buffer memory comprises a circular memory buffer.

* * * * *